No. 607,186. Patented July 12, 1898.
M. MILLER.
LAND ROLLER AND PULVERIZER.
(Application filed Feb. 8, 1898.)
(No Model.)
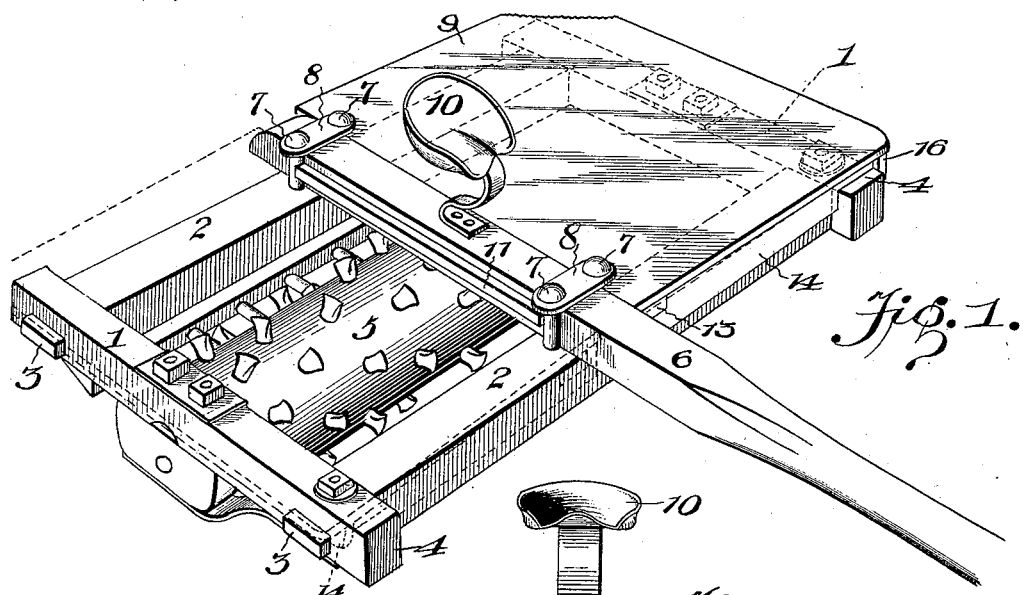
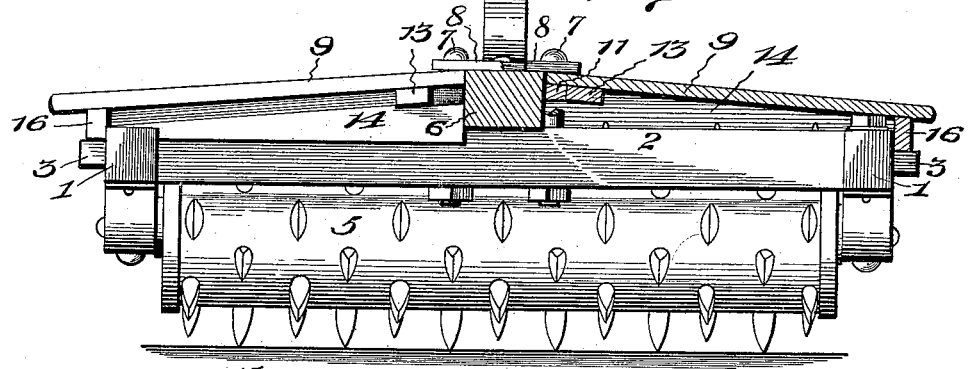
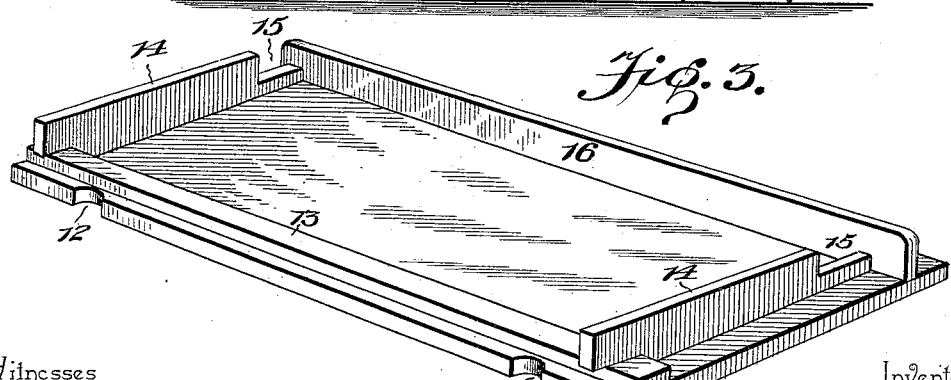
Witnesses
A. Roy Appleman
U. B. Hillyard
By his Attorneys,
C. A. Snow & Co.
Inventor
Martin Miller

UNITED STATES PATENT OFFICE.

MARTIN MILLER, OF TIFFIN, OHIO.

LAND ROLLER AND PULVERIZER.

SPECIFICATION forming part of Letters Patent No. 607,186, dated July 12, 1898.

Application filed February 8, 1898. Serial No. 669,588. (No model.)

*To all whom it may concern:*

Be it known that I, MARTIN MILLER, a citizen of the United States, residing at Tiffin, in the county of Seneca and State of Ohio, have invented a new and useful Land Roller and Pulverizer, of which the following is a specification.

This invention has relation to that class of agricultural implements for preparing the soil for the reception of seed, and is intended to obviate the necessity for harrowing, inasmuch as the earth is simultaneously leveled, pulverized, and lightened, thereby putting it in the best possible condition for planting seed therein.

The invention is designed to improve that class of implements generally employed for pulverizing and leveling the soil and which in their construction embody an open framework and a roller or drum studded with teeth or spikes, the latter penetrating clods and lumps of earth and loosening them and serving, in conjunction with the roller, to level the land traversed thereby.

An essential feature of the invention is to protect the driver from injury should he accidentally fall from his seat or should any part of his person tend to come in contact with the crushing-cylinder, and at the same time to prevent earth from being thrown upward to the annoyance and discomfort of the driver. In accordance with the invention the upper portion of the frame is closed by a removable platform; and the invention relates to the special construction of the frame and the platform and the coöperating means whereby said platforms are fastened when in place.

For a full understanding of the merits and advantages of the invention reference is to be had to the accompanying drawings and the following description.

The improvement is susceptible of various changes in the form, proportion, and the minor details of construction without departing from the principle or sacrificing any of the advantages thereof, and to a full disclosure of the invention an adaptation thereof is shown in the accompanying drawings, in which—

Figure 1 is a perspective view of a land roller and pulverizer, showing the application of the invention, the near platform being omitted and its outline shown by dotted lines. Fig. 2 is a front view, partly in section. Fig. 3 is a detail view in perspective of a platform.

Corresponding and like parts are referred to in the following description and indicated in the views of the drawings by the same reference characters.

The frame of the implement is of rectangular shape and is composed of longitudinal bars 1 and front and rear bars 2, having their end portions tenoned and fitted into mortises in the end portions of the longitudinal bars, the tenoned ends projecting beyond the longitudinal bars, as shown at 3, and the end portions of the longitudinal bars extending beyond the front and rear bars, as shown at 4. The spiked or toothed roller, drum, or cylinder 5 is journaled at its ends in bearings applied to the longitudinal bars 1 and rotates as the implement is drawn over the field and levels, crushes, and pulverizes the earth passed over thereby. The pole or tongue 6 is located centrally of the frame and is secured thereto by vertical bolts 7 and yoke-plates 8, the bolts being disposed upon opposite sides of the pole and the yoke-plates extending over the pole and having their end portions projecting beyond the sides thereof and apertured to receive the upper ends of the bolts 7 and to overlap the inner portions of the platforms 9, located upon each side of the pole and closing the upper portion of the frame, thereby protecting the driver from injury and dust and dirt. The driver's seat 10 is secured to the rear portion of the pole at a point between the front and rear bars 2. Strips 11 are secured to the sides of the pole or tongue 6 and are intended to receive and support the inner edges of the platform.

The platforms 9 are of corresponding size and like formation and are strengthened by the application thereto of end and side strips. Notches 12 are formed in the inner edges of the platform to receive the front and rear bolts 7, so that the platforms may come close against the sides of the pole or tongue. A strip or cleat 13 is secured to the inner edge portion of each platform and is intended to abut against the outer edge of the strip 11 subjacent thereto, the strip 13 being located a sufficient distance from the inner edge of the platform so as to admit of said edge portion overlapping the strip 11 and touching the sides of the pole or tongue 6. Transverse strips 14 are secured to the end portions of each platform and are located a distance apart so as to snugly embrace the outer sides of the front and rear bars 2 of the main frame, and these strips 14 are notched or cut away at their outer ends, as shown at 15, to fit over and receive the end extensions of the longitudinal bars 1, whereby the platforms when in position are prevented from outward displacement. A companion strip 16, parallel with the inner strip or cleat 13, is secured to the outer edge portion of each platform and overlaps and bears against the outer side of the contiguous bar 1 and rests upon the projections 3, whereby the platform is supported at its outer edge. The platforms when in position are prevented from outward displacement by the projecting portions or extensions 4 entering the notches 15 of the transverse strips 14 and are held from vertical movement at their inner edges by the end portions of the yoke-plates 8 extending thereover. When it is required to remove the platforms, they are simply lifted at their outer edges until the notched portions of the strips 14 clear the end extensions 4, when an outward movement will disconnect the platforms from the frame, as will be readily understood. The reverse of this operation is practiced when placing the platform in position.

Having thus described the invention, what is claimed as new, and desired to be secured by Letters Patent, is—

1. In an agricultural implement, the combination of the frame, a pole or tongue secured thereto, a platform closing the upper side of the frame and having an interlocking connection at its inner edge with the pole or tongue at one side of the latter, said platform having front and rear transverse strips at the lower side thereof adapted to engage with corresponding sides of the front and rear bars of the frame, and having their outer ends engaging with the inner side of the longitudinal bar of the frame, substantially as set forth.

2. In an agricultural implement, the combination of a frame, a pole or tongue, vertical bolts or fastenings at the sides of the pole or tongue and securing it to the front and rear bars of the frame, yoke-plates connecting the upper ends of the fastenings and projecting beyond the sides of the pole, a strip secured to a side of the pole, and a platform closing the upper side of the frame and having its inner edge portion resting upon the strip secured to a side of the pole and coming beneath the projecting end portions of the yoke-plates, substantially as described.

3. In an agricultural implement, the combination of a rectangular-shaped frame composed of longitudinal and front and rear bars having their end portions joined and projecting, forming end or corner extensions, a pole or tongue placed centrally upon the front and rear bars, vertical bolts for connecting the pole to the frame-bars, yoke-plates extending over the pole and receiving the upper ends of the bolts and projecting beyond the sides of the said pole, strips applied to the sides of the pole, platforms closing the top side of the frame at each side of the pole and having their inner edges notched to receive the vertical bolts and resting upon the strips secured to the sides of the pole and coming beneath the end extensions of the yoke-plates, outer strips secured to the platforms and overlapping the outer side of the longitudinal frame-bars and resting upon the end extensions of the front and rear bars, and front and rear transverse strips secured to the ends of the platforms and embracing the sides of the front and rear frame-bars and having their outer ends notched to receive the end extensions of the longitudinal bars, substantially as and for the purpose set forth.

In testimony that I claim the foregoing as my own I have hereto affixed my signature in the presence of two witnesses.

MARTIN MILLER.

Witnesses:
E. E. WILLIAMS,
G. R. ADAMS.